3,083,505
MANUFACTURE OF FLAT GLASS IN CONTINUOUS RIBBON FORM
Hubert Cecil Wynne, Barnby Dun, near Doncaster, England, assignor to Pilkington Brothers Limited, Liverpool, England, a British company
Filed June 4, 1953, Ser. No. 359,547
Claims priority, application Great Britain June 9, 1952
6 Claims. (Cl. 65—65)

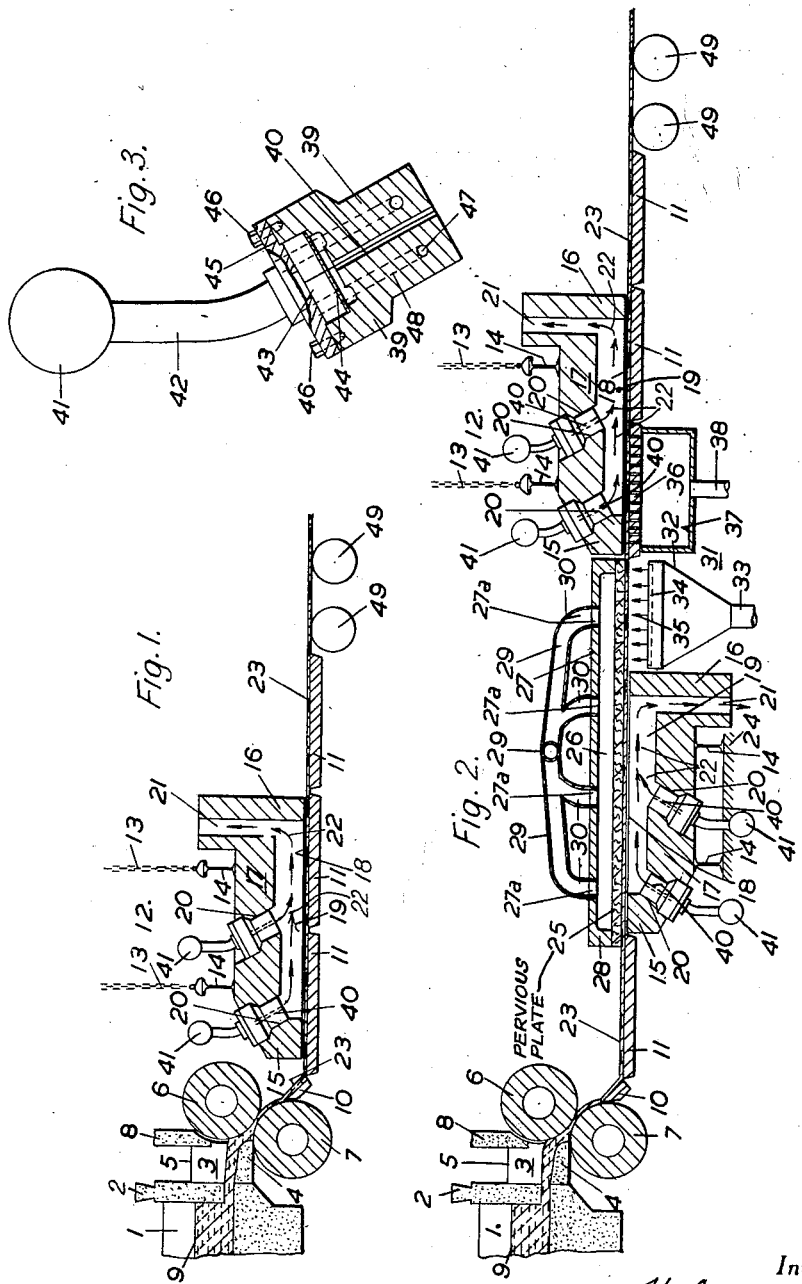

This invention relates to the manufacture of flat glass in continuous ribbon form.

In the manufacture of flat glass in continuous ribbon form a usual practice is to flow the molten glass from a spout of a tank furnace, in which the glass batch is melted, to the pass between casting rolls which are driven at a slow peripheral speed which is substantially the same as the speed of the ribbon of glass which emerges from the rolls. These rolls are of greater length than the dimension of the width of the ribbon and as the ribbon passes between them squash it to the desired thickness. The rolls are mounted for mutual adjustment to regulate the distance between their peripheries, which distance determines the thickness of the ribbon emerging from the rolls. This operation is sometimes referred to as "sizing."

During the operation of sizing the ribbon, the glass passes in intimate contact with the metal of the two rolls and accordingly a heat exchange is effected between the surfaces of the ribbon and the rolls so that the surfaces set as a result of the loss of heat by heat transfer to the rolls.

In the manufacture of glass objects such as drinking goblets the surfaces are brilliant because the surfaces set as a result of heat losses achieved solely by radiation, and by heat exchange with a gaseous medium. This result is referred to by glass makers as "fire finish."

A main object of the present invention is to obtain a fire finish on rolled flat glass produced in continuous ribbon form.

A method of manufacturing flat glass in continuous ribbon form according to the invention is characterised by forming and directing a sheet of flame towards the ribbon of glass to move in substantial parallelism therewith to progressively sweep surface of the moving ribbon with the sheet of flame to impart heat to an extent at least to compensate for loss of heat in the surface during sizing, whereby the heated surface of the ribbon is remelted sufficiently to obtain a fire finish thereon and then allowing the remelted surface to set solely by heat losses due to radiation and heat exchange with a gaseous medium as the ribbon is advanced.

The invention is applicable to the production of "slow setting glass" in flat ribbon form. By "slow setting glass" is meant a glass having in its composition a low silica ($SiO_2$) content e.g. 70%, and a low lime (CaO) content e.g. 4%, but the invention is equally applicable to the production of quick setting glass in flat ribbon form e.g. those glasses known as "plate glass" and "window glass."

Where the fire finish produced in accordance with the invention is required to be obtained on the under surface of a moving flat ribbon of glass, a method of manufacturing flat glass in continuous ribbon form is characterised by simultaneously applying a suction to the upper surface of the ribbon as the ribbon passes over the heating sheet of flame, said suction being applied over sufficient area of the upper surface to maintain the moving ribbon in the horizontal path.

The present invention also comprehends the production of a fire finish on both surfaces of the moving ribbon and from this aspect the invention comprises a method of manufacture of flat glass in continuous ribbon form in which the flame treatment of the undersurface precedes a similar flame treatment of the upper surface, and the heated under surface is chilled by air directed against the under surface, so that the fire finish acquired on the under surface is not impaired as the ribbon moves forward to become supported in the horizontal path during the flame treatment to produce the melted condition of the upper surface, and then allowing the upper surface to set by radiation and by heat exchange with a gaseous medium whereby both surfaces of the ribbon acquire a fire finish.

The invention also comprises apparatus for manufacturing rolled flat glass in continuous ribbon form with a fire finish produced from a remelted surface of the ribbon, comprising the combination with a spout of a glass furnace of upper and lower casting rolls disposed so that the spout directs the glass flow to the pass of said rolls, a plane support for the ribbon extending forwardly from the lower roll, a refractory hood structure including a roof and side walls erected over the support and disposed so that the ribbon can pass on the support under the hood thereby forming with the hood a substantially closed heating chamber, and forming means for producing a sheet of flame within the chamber and for directing the flame in the direction of movement of the glass and in substantial parallelism therewith so that the whole upper surface of the glass is swept by the sheet of flame.

The plane support for the ribbon which extends forwardly from the casting rolls may be formed by a porous plate or an apertured plate, on the underside of which plate a chamber is formed whereby air under sufficient pressure is delivered from the chamber through the supporting plate to provide a cushion of air between the moving ribbon and the plate, thereby providing a frictionless gaseous film between the ribbon and the support. However, no claim is herein made to the novelty per se of a supporting plate with associated means for producing an air cushion thereover.

The roof of the hood structure is slotted at the end near to the rolls through which slot formation burning gases may be directed as a sheet of flame, towards the glass to move in the direction of the glass and in substantial parallelism therewith and an outlet for the products of combustion formed in the chamber structure at the opposite end thereof.

Apparatus constructed according to the present invention for producing flat glass in ribbon form of which both surfaces have a fire finish is characterised in that the hood forming an upper heating chamber is spaced away from the rolls, and in that there is provided a second heating chamber structure, means for forming a sheet of flame to be interposed between the hood and the rolls but facing the under surface of the ribbon, a suction plate member having air passages therethrough above the ribbon in the vicinity of the second heating chamber and in an extension thereof disposed beyond the second heating chamber, a cover to the plate member and extension means for applying a vacuum within the cover, the total suction force applied to the glass being such that the ribbon can be advanced in contiguity with the plate member, means for directing an air flow against the under surface of the glass to chill the under surface before it leaves the suction plate member, a plane support for the ribbon extending forwardly from the rolls to the said second heating chamber and a continuation of said support extending forwardly from said air flow directing means in the direction of movement of the ribbon, whereby both surfaces of the ribbon may be thermally treated to acquire a fire finish during the forward movement of the ribbon.

In order that the invention may be more clearly understood, reference will now be made to the accompanying diagrammatic drawings which illustrate, by way of example, two preferred embodiments thereof.

In the drawings FIGURE 1 shows in sectional elevation the apparatus associated with the casting rolls of a glass melting tank, and comprising heating means for producing a re-melted surface on the glass. The apparatus shown in FIGURE 1 is suitable for the production of a fire finish on either a slow setting opaque glass or a quick setting glass such as "plate glass" or "window glass."

FIGURE 2 shows similar apparatus adapted for producing a re-melted surface on both surfaces of a ribbon of glass, and is particularly suitable for the production of a ribbon of clear glass of which both surfaces have a fire finish, and FIGURE 3 is a detail sectional elevation indicating the construction of the burners used in the heating apparatus incorporated in the construction shown in both FIGURES 1 and 2.

In the drawings like references indicate the same or similar parts.

Referring first to the construction shown in FIGURE 1, a canal of a continuous glass melting tank is indicated at 1, the regulating tweel at 2 and the spout at 3, the spout comprising a floor or "lip" 4 and side jambs 5, one of which only is illustrated in FIGURE 1, the side jambs and lip forming a spout of generally rectangular cross-section, and associated with the spout are a pair of water cooled casting rolls, on which spout a cover may be secured in known manner. The upper casting roll is indicated at 6 and the lower casting roll at 7. A gate 8 is adjustably suspended (by means not shown) in a vertical plane in contiguity with the casting roll 6.

The gate 8 shields the top roller 6 from the heat radiator by the molten glass 9 flowing from the canal 1 over the spout lip 4 to the pass between the rolls 6 and 7.

Heaters may be incorporated in the side jambs, in the usual manner, to maintain the jambs at a high temperature to minimise the temperature gradient across the spout.

The upper casting roll 6 is disposed in advance of the lower casting roll 7 so that the molten glass 9 flows from the lip 4 on to an upper part of the roll 7 comprising a downwardly and forwardly directed arcuate casting bed moving in the same sense as the general direction of flow from the spout, so that the molten glass 9 on leaving the spout and arriving on this casting bed is constrained to flow forwardly, thereby preventing backward flow of the glass leaving the spout lip 4.

Forwardly of the lower casting roll 7 is arranged a support for the ribbon of glass emerging from the pass between the casting rolls 6 and 7. The support comprises a sloping member 10 and a series of horizontal members 11. The member 10 directs the ribbon leaving the lower casting roll 7 into a predetermined horizontal path prescribed for the ribbon by the disposition of the plane supports 11.

Over the supports 11 a refractory hood structure 12 of rectangular shape, as viewed in plan, which extends across the full width of the ribbon issuing from the rolls 6 and 7, is suspended by chains 13 coupled to joists 14 forming part of the structure. The chains are associated with hoisting gear, not shown, which allows the hood structure to be raised clear of the supports and casting rolls when desired, or to be lowered into contiguity with the ribbon passing over the supports 11, but not resting thereon, the structure then being disposed, with respect to the supports, so that under the rear end wall 15 of the structure and under the forward end wall 16 thereof a slot-like passage is provided for the entry and exit of the ribbon.

The hood structure 12 comprises in addition to the end walls 15 and 16 a roof 17 and two side walls 18, only one of which is shown, thereby defining a chamber 19 within the structure.

The structure 12 is provided with wide slots 20 to accommodate the burners, the construction of which is hereinafter described by particular reference to FIGURE 3, which burners each produce a sheet of flame which sweeps the whole upper surface of the ribbon, exposed within the chamber 19, in the direction of the moving ribbon. An outlet for the burnt gases is indicated at 21, and the general flow of the flames is indicated by the arrows 22, from which it will be appreciated that the flame from each of the burners arranged in the two slots 20 provided in the roof of the heating chamber 19 moves in substantial parallelism with the ribbon, the flame from each burner being in nature a sheet of flame which progressively sweeps the surface of the moving ribbon as it passes through the heating chamber 19.

The roof structure provides a substantially closed chamber over the moving ribbon of glass, so that the upper surface of the ribbon can be remelted by the heat produced from the sweeping sheet of flame imparting heat at least in compensation for the loss of heat suffered by the molten glass 9 in passing between the casting rolls 6 and 7, in particular by reason of the heat exchange effected between the glass 9 and the upper roll 6. The side walls 18 of the chamber 19 may depend beyond the sides of the ribbon.

The ribbon of glass emerging from the casting rolls is generally indicated at 23, and it will be observed that the heat treatment effected in accordance with the invention is applied as soon as the ribbon arrives at the predetermined horizontal path for the ribbon, and accordingly the heat treatment is effected as quickly as possible after leaving the casting rolls. After the ribbon 23 leaves the heating chamber 19 it is exposed to atmosphere and the remelted upper surface sets solely by loss of heat due to radiation and to heat exchange with a gaseous medium, hence a fire finish is obtained.

The roll 7 has a highly polished surface where the underface of the ribbon is required to be smooth, as with clear glass, or the surface of the roll may have a configuration to impart a pattern to the undersurface of the ribbon, in particular. Where a ribbon of slow setting opaque glass is being produced the roll 7 may be formed with intersecting grooves which produce on the undersurface of the ribbon a rectilinear grid pattern in relief constituted by the intersecting ribs which are formed.

Referring now to FIGURE 2 of the drawings which illustrates a method in accordance with the invention of producing a fire finish on both surfaces of the ribbon 23, it will be seen that the roof structure 12 has been horizontally displaced with respect to the casting rolls 6 and 7, and that between this roof structure and the casting rolls an exactly similar heating chamber is provided on the under side of the path of travel of the ribbon. Accordingly, in this apparatus a heating chamber 19 is provided which remelts the upper surface of the ribbon and a similar heating chamber 19 is provided which remelts the undersurface of the ribbon as a stop precedent to the heat treatment of the upper surface. In this arrangement the joists 14 of the under heating chamber structure 19 are carried on a suitable support indicated at 24, the arrangement being such that there is a sufficient space betwen the end walls 15 and 16 of the structure and the undersurface of the ribbon to permit the free passage of the ribbon over the under heating chamber 19 is contiguity therewith, thereby a virtually closed heating chamber is provided opening to the under surface of the ribbon 23.

The under heating chamber 19 being constructed exactly as already described with reference to the hood structure 12, the under surface of the ribbon is heat treated in exactly the same way as the upper surface is treated as already described with reference to the construction shown in FIGURE 1, that is to say, each burner in the under chamber is so disposed and constructed that from each a sheet of flame issues and progressively sweeps the juxtaposed surface of the moving ribbon as it advances.

In order to maintain the ribbon 23 in its predetermined horizontal path during its passage over the under heating chamber 19 operating against its under surface, there is disposed above the ribbon a suction plate member 25, located in the plane of the upper surface of the moving ribbon, and forming the floor of a suction chamber 26 comprises within a roof element 27 having a peripheral flange 28, which intimately engages the suction plate 25 and is secured thereto by fixing elements (not shown). The roof element 27 is apertured as indicated at 27a and a manifold 29 with branches 30 is connected to the suction chamber 26, the manifold being connected to an exhaust fan or pump for maintaining the desired degree of vacuum in the suction chamber 26 which is such as to hold the ribbon to the suction plate 25 and yet permit a passage of the ribbon 23 past the suction plate 25.

The suction plate 25 may be formed of porous material e.g. formed of a suitable sintered material e.g. sintered stainless steel or ceramic material, or the plate 25 may be apertured to the extent desired to provide the requisite suction area on the ribbon 23 to hold the latter in moving contact with the plate 25.

Disposed between the heating chamber 19 operating on the under surface of the ribbon 23 and the heating chamber 19 operating on the upper surface of the ribbon 23 is means, generally indicated at 31, for producing a chilling effect on the under surface of the ribbon 23 immediately after it leaves the under heating chamber 19.

In the construction illustrated, the chilling means 31 is constituted by a trough-shaped funnel 32 provided with a supply pipe 33 through which air of the desired temperature is supplied, and the mouth of the funnel 32 is provide with an apertured plate 34 through which streams of air emerge as indicated by the arrows 35. Thus the re-melted under surface of the ribbon 23 is permitted to set solely by loss of heat by radiation so that a fire finish is achieved and so that sufficient hardness is given to the surface before the advancing ribbon reaches the forward supports 11 which carry the ribbon as it moves forward.

The length of the plate 34 will correspond to the distance between the chamber 19 operating on the under surface of the ribbon 23 and the supporting member 11 next ahead of the chilling means 31, and the width thereof will correspond to the width of the ribbon.

A plurality of chilling means may be employed where the distance between the under heating chamber 19, and the supports 11 ahead thereof are spaced apart at such a distance as to make uneconomical the employment of one funnel 32, and to regulate the rate of chilling, valves may be provided in the supply lines such as 33 so as to avoid too sudden a chilling of the melted under surface. From the foregoing it will be observed that the support for the ribbon 23 comprising the series of plates 11, is interrupted to accommodate the under heating chamber 19 and the chilling means.

In the apparatus described the suction plate 25 includes an extension disposed forwardly of the under heating chamber 19 so that the ribbon immediately beyond the under heating chamber 19 is maintained in the prescribed horizontal path by the suction applied through the extension over-lying the chilling means 31.

From the foregoing it will be understood that the under surface of the ribbon is subjected to the air streams 35 which assure the production of the required fire finish on the under surface of the ribbon, and prevent injury to the fire finished surface produced by the under heating chamber 19, when moving over the supporting member 11 ahead of the chilling means.

However the supporting member 11 next ahead of the chilling means 31 may be constituted by a porous plate, as for example, a plate formed from a suitable graphite compound, or a plate with apertures as indicated at 36, and a chamber 37, provided with an inlet 38 through which a gaseous medium, for example air, is supplied under pressure, in order to achieve the formation of a frictionless gaseous film between the ribbon 23 and the support 11. Thus a cushion of air is provided between the ribbon and the apertured supporting plate 36, which cushion assists in preventing any damage to the fire finished under surface of the ribbon 23 during its advance. One or more of the following supporting plates 11 may be similarly constructed.

Each slot 20 in the walls 15 and 17 of the heating chamber 19 extends substantially across the full width of the chamber, and a burner, which is of rectangular form, is fitted into each slot. As clearly shown in FIGURE 3 each burner is constituted by two similar iron sections 39 which are recessed on each of the opposed faces so at to form a slot 40 extending for the full width of the burner. The gas for combustion, with which air is admixed as desired, is supplied from a main 41, through branches 42 into a head space 43 in the burner, which head space houses a wire gauze 44. The gas is then forced through the slot 40, to the mouth of the burner and the flames follow the paths 22 indicated in FIGURES 1 and 2.

The width of each heating chamber 19 is such that when the burners are accommodated therein the slot 40 of each burner extends across the full width of the ribbon 23.

The two halves 39 of the burner are bolted together, and the head space is covered by a plate 45 which is secured to each half of the burner by studs indicated at 46, and each branch 42 is fitted into a plate 45.

As indicated in FIGURE 3 the two halves 39 of the burner may be drilled as indicated at 47 to connect with bores 48 which form part of a closed circuit through which cooling water may be circulated. The supply line to, and the discharge line from, the bores 48 are omitted from the drawing for the sake of clarity.

In FIGURES 1 and 2 the rollers indicated at 49 perform part of the usual system of supporting rollers which carry the ribbon and cause the ribbon to advance in the predetermined horizontal plane into the annealing lehr, not shown, usually associated with the continuous ribbon forming apparatus.

By the present invention a novel method of treating a moving ribbon of glass is achieved by which the brilliance of fire finish is obtained on one or both surfaces as the case may be as the ribbon advances, and the apparatus herein described is effective for the production of a fire finish on a slow setting glass in flat ribbon form, in particular that opaque type of slow setting glass marketed under the registered trademark "Vitrolite," as well as for the production of a fire finish on a clear glass. In the latter case a fire finish can, in accordance with the invention, be effectively produced on both surfaces of a moving ribbon of glass such as is produced in the manufacture of those flat clear glasses known as "plate glass" and "window glass."

Instead of using the sloping support member 10 immediately below the casting roll 7, two or more rollers may be used to guide the ribbon 23 to the horizontal plane supports, when the ribbon is being made of clear glass, since, owing to the pull on the ribbon applied by the initial rollers in the lehr there is a tendency for the ribbon to keep clear of the sloping support 10.

I claim:

1. Method of manufacturing flat glass in continuous ribbon form characterized by forming the ribbon as it is flowed from a glass melting furnace under conditions to cause a surface of the ribbon to lose substantial heat by conduction, advancing the formed ribbon lengthwise and continuously, forming a sheet of flame and directing it along said surface of the ribbon in substantial parallelism therewith and in the direction of movement of the ribbon to sweep progressively said surface of the advancing ribbon with the sheet of flame, and to impart thereby heat to said surface to an extent at least to compensate for that heat in the surface lost during the forming of the ribbon, and then allowing the remelted surface to set solely due to radiation and to the cooling action of a gaseous medium in contact with said surface while maintaining said surface free from mechanical disturbing influences.

2. Method of manufacturing flat glass in continuous ribbon form characterized by sizing the ribbon as it is flowed from a glass melting furnace, constraining the sized ribbon to travel in a substantially horizontal path, forming and directing a sheet of flame upwardly towards the ribbon of glass to produce a fire finish thereon and progressive sweeping of the under surface of the moving ribbon with the sheet of flame to impart heat to an extent at least to compensate for loss of heat in the surface during sizing, whereby the heated surface of the ribbon is remelted sufficiently to obtain a fire finish thereon, simultaneously applying a suction to the upper surface of the ribbon as the ribbon passes over the heating sheet of flame said suction being applied over sufficient area of the upper surface to maintain the moving ribbon in the horizontal path, and then allowing the remelted surface to set solely due to radiation and heat exchange with a gaseous medium as the ribbon is advanced.

3. Method of manufacturing flat glass in continuous ribbon form according to claim 2, wherein the upper surface of the ribbon is flame treated in a manner similar to the flame treatment of the under surface and follows the heat treatment of the under surface, and the heated under surface is chilled by air directed against the undersurface, so that the fire finish acquired on the under surface is not impaired as the ribbon moves forward to become supported in the horizontal path during the flame treatment to produce the melted condition of the upper surface, and then allowing the upper surface to set by radiation and by heat exchange with a gaseous medium whereby both surfaces of the ribbon acquire a fire finish.

4. Method of manufacturing flat glass in continuous ribbon form characterized by forming the ribbon as it is flowed from a glass melting furnace under conditions to cause a surface of the ribbon to lose substantial heat by conduction, continuously advancing the formed ribbon in a substantially horizontal path with said ribbon surface constituting the under surface and the other surface of the ribbon constituting the upper surface, heating the under surface of the ribbon in a zone of travel of the ribbon sufficiently to remelt said under surface, simultaneously applying a suction to the upper surface of the ribbon in said zone as the ribbon passes along said zone to maintain the moving ribbon in the horizontal path, and then allowing the remelted surface to set solely due to radiation and heat exchange with a gaseous medium as the ribbon is advanced.

5. An apparatus for manufacturing flat glass in continuous ribbon form, comprising means for continuously forming glass in ribbon form from a glass melting furnace including a casting member on which the ribbon is cast, said casting member causing the surface of the ribbon in contact therewith to lose substantial heat by conduction, means for advancing the formed ribbon lengthwise and continuously away from said forming means, means for forming a sheet of flame and for directing it along said surface substantially parallel thereto and in the direction of movement of the ribbon to sweep progressively said surface during the movement of the ribbon and to cause said surface to be remelted, and means for continuously advancing the ribbon with the remelted surface through a setting zone in which the only medium in contact with said surface is a gaseous medium to cause said surface to set solely due to radiation and to the cooling action of said gaseous medium.

6. Apparatus for manufacturing flat glass in continuous ribbon form comprising in combination with a spout of a glass furnace of upper and lower casting rolls disposed so that the spout directs the glass flow to the nip of the rolls, a plane support for the ribbon extending forwardly from the lower roll, an inverted refractory hood structure including a roof and side walls erected under the support and disposed so that the ribbon can pass over the hood structure and form with the hood structure a substantially closed heating chamber, means for forming a sheet of flame within the chamber and facing the under surface of the ribbon to remelt said under surface, a suction plate member extending above and beyond said inverted refractory hood structure and located in the plane of the upper surface of the moving ribbon, said plate member having air passages therethrough above the ribbon in the vicinity of said heating chamber structure and in an extension thereof disposed beyond the chamber, a cover to the plate member and extension, means for applying a vacuum within the cover, the total suction force applied to the glass being such that the ribbon can be advanced in contiguity with the plate member, means for directing an air flow against the under surface of the moving ribbon to chill the under surface before it leaves the suction plate member, a continuation of said plane support extending forwardly from said air flow directing means in the direction of movement of the ribbon, a refractory hood structure including a roof and side walls erected over the said continuation of the plane support and disposed so that the ribbon advanced from the inverted roof structure can pass on the support under the hood structure over the ribbon, the ribbon thereby forming with the hood structure a substantially closed heating chamber, and means for forming a sheet of flame within the latter chamber for remelting the upper surface of the ribbon, whereby both surfaces of the ribbon may be thermally treated to acquire a fire finish during the forward movement of the ribbon.

References Cited in the file of this patent

UNITED STATES PATENTS

| | | |
|---|---|---|
| 972,166 | De Bay | Oct. 11, 1910 |
| 1,424,155 | Clark | Aug. 1, 1922 |